Aug. 26, 1969  A. WINKLER ET AL  3,463,071
CAMERA WITH AUTOMATIC FILM THREADING DEVICE
Filed May 16, 1966
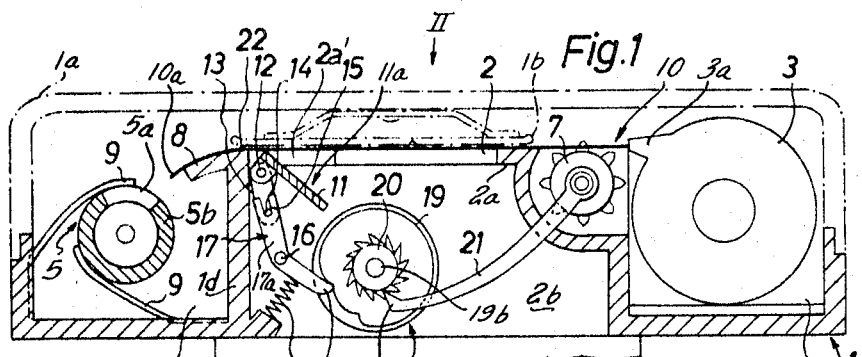
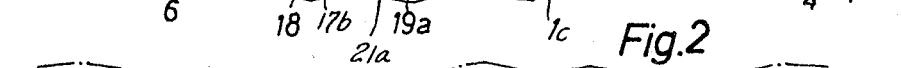
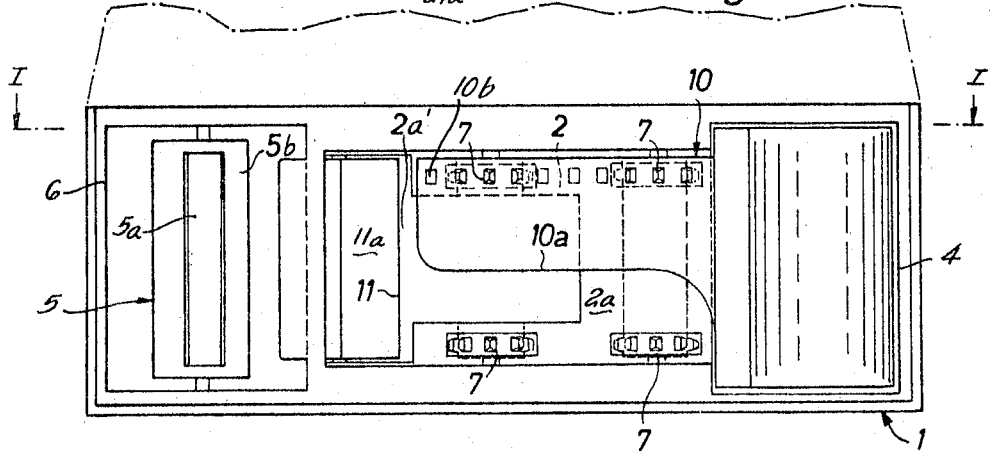
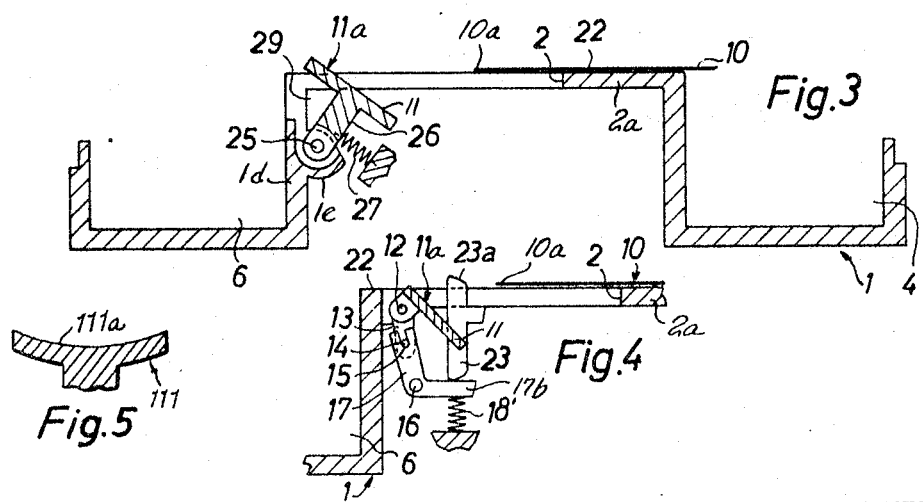
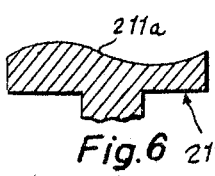
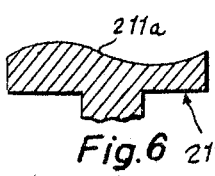
INVENTORS
ALFRED WINKLER
KARL BAMMESBERGER
HEINZ ERNST
BY Michael J. Striker
their ATTORNEY United States Patent Office 3,463,071
Patented Aug. 26, 1969

3,463,071
CAMERA WITH AUTOMATIC FILM
THREADING DEVICE
Alfred Winkler, Munich, Karl Bammesberger, Munich-Untermenzing, and Heinz Ernst, Munich, Germany, assignors to Agfa-Gevaert Aktiengesellschaft, Leverkusen, Germany
Filed May 16, 1966, Ser. No. 550,268
Claims priority, application Germany, May 15, 1965,
A 49,230
Int. Cl. G03b 19/04, 1/48
U.S. Cl. 95—31      20 Claims

ABSTRACT OF THE DISCLOSURE

A photographic camera wherein the film is guided in a channel extending between a chamber for a supply of roll film and a chamber for a take-up spool, and wherein the channel communicates with a window into which the leading end of film tends to curl during transport from the first chamber into the second chamber. The window accommodates a movable guide member having a guide surface which is inclined with reference to the path of film in such a way that it can deflect the leading end back into the channel.

---

The present invention relates to cameras in general, and more particularly to improvements in cameras which are provided with automatic film threading devices, also known as auto-threaders.

Cameras with automatic film threading features are known in the art. However, the presently known auto-threaders are not constructed with a view to insure foolproof connection of the film with the take-up spool when the leading end of the film exhibits the tendency to curl or bend and to penetrate through the window which is located between the supply and take-up spools rearwardly of the lens mount and in front of the pressing plate in a modern 35-mm camera. The window is needed in order to permit light rays entering through the objective to reach that film frame which is located in front of the pressing plate, and such window communicates with the customary film channel which defines a path along which the film travels in response to manipulation of the film transporting mechanism. If the leading end of the film happens to penetrate into the window in the course of an automatic film threading operation, it cannot reach the take-up spool and cannot be automatically coupled thereto. The above described tendency of the leading end to curl and to penetrate into the window behind the lens mount is especially pronounced in presently utilized roll films for 35-mm. cameras wherein the width of the leading end of the film is less than the width of the remaining major part of the film, i.e., wherein the leading end resembles a lip or tongue which carries a single row of perforations and normally extends from the mouth of the supply cartridge. When the supply cartridge is stored in its box, the leading end of the film in convoluted around the cartridge and such manner of storing a fresh film in the box for a supply cartridge also contributes to the tendency of the leading end to curl while traveling in the film channel on its way into the chamber for the take-up spool of an auto-threader.

Accordingly, it is an important object of the present invention to provide cameras which embody an auto-threader with guide means capable of automatically preventing the leading end of the film from leaving the film channel when the leading end is advanced toward and is about to be coupled with the take-up spool of the auto-threader.

Another object of the invention is to provide a camera of the just outlined characteristics wherein the novel guide means performs another important function, particularly the function of assisting the remaining parts of the camera in maintaining a film frame in the focal plane when the camera is ready to take a picture.

A further object of the invention is to assemble the novel guide means of a small number of simple and compact component parts so that such parts occupy little room and contribute little, if anything, to the dimensions of the camera.

An additional object of the invention is to provide a camera, particularly a still camera, wherein the guide means for the leading end of a roll film is coupled with the frame counting device of the camera in a novel way.

Still another object of the instant invention is to construct and mount the guide means in such a way that it can be moved by the film proper when the latter is properly coupled to the take-up spool of the auto-threader.

An additional object of the invention is to provide guide means of the type which may be used in combination with practically all presently known auto-threaders.

A concomitant object of the present invention is to provide a guide means which, if desired, may be readily installed in existing cameras.

Another object of the invention is to provide a guide means which insures absolutely foolproof operation of an auto-theader for roll film.

Briefly stated, one feature of our present invention resides in the provision of a camera, particularly a still camera, which comprises a housing having a first and a second chamber respectively arranged to accommodate a supply of roll film (e.g., a supply of film convoluted in a supply cartridge) and a rotary take-up spool, a film channel extending between the two chambers and defining a path along which the leading end of the film can be advanced from the first toward the second chamber, and a window which is located in front of the film channel and communicates therewith so that a leading end which has a tendency to curl or bend can enter the window on its way toward the second chamber, a film transporting mechanism including one or more sprockets for transporting the film between the two chambers, and guide means positioned in the housing to deflect a leading end which enters the window back into the film channel. The camera also comprises automatic threading means (also called auto-threader) including a rotary take-up spool provided in the second chamber for clamping the leading end and for thereupon convoluting the film around the core of the take-up spool in response to operation of the film transporting mechanism in a sense to transport the film into the second chamber. In a still camera, the film is normally of the type whose leading end has a width which is less than the width of the remaining major part of the film, i.e., the leading end is normally provided with a single row of perforations.

The aforementioned novel guide means preferably comprises a movable guide member which is rockable in the housing and has a flat, concave, convex or S-shaped guide surface which, at least when the film is not as yet coupled to the take-up spool, assumes an operative position in which it is inclined with reference to the film channel in a direction to automatically return the leading end into the film channel when the film transporting mechanism is operated to transport the leading end through the film channel and into the second chamber.

The novel features which are considered as characteristic of the invention are set forth in particular in the appended claims. The improved camera itself, however, both as to its construction and its mode of operation, together with additional features and advantages thereof, will be best understood upon perusal of the following detailed description of certain specific embodiments with reference to the accompanying drawings, in which:

FIG. 1 is a horizontal section through a still camera which embodies one form of our invention and wherein the guide member is controlled by the frame counter, the section of FIG. 1 being taken in the direction of arrows substantially as seen from the line I—I of FIG. 2;

FIG. 2 is a fragmentary rear elevational view of the camera as seen in the direction of the arrow II in FIG. 1, with the rear wall of the housing removed;

FIG. 3 is a fragmentary horizontal section through a modified camera wherein the guide member is rockable in response to tensioning of the film;

FIG. 4 is a fragmentary horizontal section through a third camera wherein the guide member is again rockable by the film;

FIG. 5 is a fragmentary sectional view of a guide member having a concave guide surface; and FIG. 6 is a fragmentary sectional view of a guide member having a sinusoidal guide surface.

Referring to the drawings in detail, and first to FIGS. 1 and 2, there is shown a still camera which comprises a housing 1 defining a window 2 surrounded by a film platform 2a and located in front of a hinged or removable rear wall 1a which is indicated by phantom lines. The housing 1 is further provided with two chambers 4 and 6 which are located at the opposite sides of the window 2 and respectively serve to accommodate a film supply cartridge 3 and a take-up spool or reel 5. The camera also comprises a so-called auto-threader which enables the operator to automatically thread the leading end 10a of roll film 10 along the platform 2a in front of the customary pressing plate 1b which is carried by the rear wall 1a and to clamp the leading end 10a to the take-up spool 5. In the illustrated embodiment, the auto-threader comprises an arcuate auxiliary guide member 8 which guides the film into the chamber 6 and toward an inlet or slot 5a provided in the hollow cylindrical core 5b of the take-up spool 5, and two leaf springs 9 which are secured to the housing 1 and bear against the periphery of the core 5b. When the film transporting mechanism which includes one, two or more sets of sprockets 7, advances the film 10 from the chamber 4, along the platform 2a and into the chamber 6 the leading end 10a slides in the film channel 22 between the platform 2a and pressing plate 1b, thereupon along the arcuate auxiliary guide member 8 and into the inlet 5a and, as the spool 5 begins to rotate, the film is clamped by the free end portions of the springs 9 and is held against the periphery of the core 5b so as to form a series of overlapping convolutions. The exact construction of the auto-theader forms no part of the present invention; for example, the fixed auxiliary guide member 8 may be replaced by a pivotable auxiliary guide member or by a pair of pivotable auxiliary guide members in a manner as disclosed in the copending application Ser. No. 547,568 of Winkler and Ernst, now Patent No. 3,383,068, granted May 14, 1968, which is assigned to the same assignee. This copending application also discloses the manner in which the take-up spool may be driven at a speed exceeding the speed of the sprocket wheel or wheels 7 so that the convolutions of the film are tightly packed around the core of the take-up spool. The film transporting mechanism comprises a friction clutch, not shown, which is installed in the gear train between the sprockets 7 and the take-up spool 5.

Our present invention solves the following problem: As best shown in FIG. 2, the leading end 10a of a 35-mm. roll film 10 normally resembles a lip or tongue whose width is less than the width of the remaining major portion of the film 10. In other words, the leading end or lip 10a normally carries a single row of perforations 10b. Also, such leading end 10a tends to curl or bend in a counterclockwise direction, as viewed in FIG. 1 and, therefore, as it advances along the platform 2a, it exhibits the tendency to penetrate through the window 2 and toward the lens mount 1c. This is highly undesirable because, if the leading end 10a fails to pass through the gap between the auxiliary guide member 8 and the adjoining portion of the rear wall 1a, it cannot find its way into the inlet 5a of the core 5b and is not clamped to the take-up spool 5. As the operator continues to operate the film transporting mechanism in a sense to compel the sprockets 7 to advance the film 10 toward the chamber 6, the film piles up in the space surrounded by the platform 2a and is likely to be scratched, folded or otherwise damaged. Also, an inexperienced operator might not detect such faulty operation of the camera and is likely to start making exposures while the film clogs the space within the confines of the platform 2a. On the other hand, a camera with an auto-threading feature is intended mainly for use by less experienced or clumsy persons and, therefore, the provision of a foolproof auto-threader is of utmost importance. The leading end 10a of the roll film 10 is most likely to be deflected by the left-hand partition 1d which separates the space 2b within the platform 2a from the chamber 6 for the take-up spool 5.

In accordance with our present invention, the leading end 10a of the film 10 can be properly advanced into the chamber 6 for the take-up spool 5 in the following way: The space 2b in front of the window 2 (i.e., between the lens mount 1c and the pressing plate 1c) accommodates a guide member 11 which is adjacent to the partition 1d and which, during automatic threading of the film 10, has its active guide surface 11a inclined with reference to the planes of the platform 2a and film channel 22 in such a way that the surface 11a automatically guides the leading end 10a toward the gap between the partition 1d and the rear wall 1a (and more particularly between the partition 1d and the pressing plate 1b). The window 2 is enlarged to such an extent that the guide member 11 cannot interfere with the travel of light rays which are focused by the objective onto that frame of the film 10 which is located behind the window 2. The left-hand extension of the window 2 in which the guide member 11 is located is indicated by the numeral 2a'.

In the embodiment of FIGS. 1 and 2, the guide member 11 is mounted on a carrier 13 here shown as a lever which is rockable on a pivot pin 12 mounted in the housing 1 in parallelism with the axis of the take-up spool 5. It can be said that the guide member 11 constitutes the first arm of the lever 13, and the second arm of the lever 13 is coupled to the arm 17a of a control lever 17 which is fulcrumed at 16 and is biased by a weak helical expansion spring 18 tending to rock it in a counterclockwise direction as the parts appear in FIG. 1. The arm 17a of the control lever 17 is formed with a slot 15 which receives a pin 14 on the second arm of the lever 13. The second arm 17b of the control lever 17 constitutes a follower and tracks the face of a disk cam 19 which is connected to and is rotatable with a frame counter disk 19a. The shaft 19b of the frame counter disk 19a carries a ratchet wheel 20 which cooperates with a pawl 21a provided at the end of an elongated arm 21 mounted on the common shaft of one pair of the sprocket wheels 7. When the frame counter disk 19a is reset to starting or zero position, the follower 17b extends itno a recess between two lobes of the cam 19 so that the surface 11a of the guide member 11 is free to assume the strongly inclined or operative position shown in FIG. 1. Therefore, and if the operator inserts into the chamber 4 a fresh supply cartridge 3 and operates the transporting mechanism in a sense to rotate the sprockets 7 in a counterclockwise direction, as viewed in FIG. 1, the leading end 10a of the freshly inserted roll film 10 will be drawn away from the mouth 3a of the supply cartridge 3, along the platform 2a and, if it tends to curl in a direction toward the lens mount 1c, such leading end 10a will meet the inclined guide surface 11a of the guide member 11 and will be deflected toward the pressing plate 1b so that it returns into the film channel 22 and slides along the auxiliary guide member 8 to find its way into the inlet 5a of the core 5b on the take-up spool 5. When the leading end 10a is properly coupled to the core 5b, the film transporting mechanism has changed the angular position of the frame counter disk 19a to such an extent that the follower 17b engages a crest of the face on the cam 19 and the control lever 17 thereby rocks the lever 13 in a counterclockwise direction, as viewed in FIG. 1, so that the surface 11a of the guide member 11 moves into a position of substantial parallelism with the planes of the platform 2a, channel 22 and pressing plate 1b. This reduces the size of the window 2 to a size which is just sufficient to allow for passage of light rays from the objective in the lens mount 1c to that film frame which happens to be located directly in front of the pressing plate 1b. The guide surface 11a and the adjoining portion of the pressing plate 1b then define between themselves an extension of the film channel 22 and cooperate to hold the film flat in the actual focal plane.

FIG. 3 illustrates a simplified camera wherein the control lever 17 is omitted and the guide member 11 is mounted in such a way that it normally extends rearwardly and beyond the plane of the platform 2a. The carrier or lever 26 for the guide member 11 is pivotable on a pin 25 which is mounted in a lug 1e of the partition 1d, and the partition 1d has a cutout or recess 29 which accommodates a portion of the guide member 11 when the latter is pivoted into substantial parallelism with the platform 2a. The lever 26 is biased by a relatively weak contraction spring 27 which tends to rock the guide member 11 in a clockwise direction, as viewed in FIG. 3, so that the guide surface 11a of the member 11 is inclined with reference to the planes of the platform 2a and film channel 22. If the leading end 10a of the film 10 tends to enter the window 2, it strikes against the inclined guide surface 11a and travels along the guide member 11 to enter the chamber 6 and to be automatically coupled to the take-up spool 5 (not shown in FIG. 3) in the same way as described in connection with FIGS. 1 and 2 or in another suitable manner. Once the leading end 10a is coupled to the take-up spool and the latter is rotated by the transporting mechanism to wind the film around its core, the film is tensioned and rocks the guide member 11 in a counterclockwise direction so that the member 11 enters the cutout 29 and assumes a position of parallelism with the platform 2a. The manner in which the take-up spool can tension the film (once its core is properly connected with the leading end 10a) is fully disclosed in the aforementioned copending application of Winkler and Ernst. The spring 27 is too weak to prevent rocking of the guide member 11 in response to the pressure transmitted by tensioned film 10; however, this spring is strong enough to automatically return the guide member 11 to the position of FIG. 3 when the leading end 10a of the film 10 is not coupled to the core of the take-up spool.

Referring finally to FIG. 4, there is shown a portion of a camera which constitutes another modification of the camera shown in FIGS. 1 and 2. In this embodiment of our invention, the control lever 17 does not receive motion from the frame counter disk. Instead, the arm 17b of the control lever 17 receives motion from a reciprocable tracking member or pusher 23 whose rear end portion or tip 23a extends into the film channel 22, i.e., rearwardly of and beyond the platform 2a. The spring 18' is an expansion spring and insures that the arm 17b bears against the front end portion of the pusher 23. The rear end portion 23a of the pusher 23 extends into that portion of the film channel 22 which is out of the way of the leading end 10a so that the leading end cannot affect the position of the pusher against the bias of the spring 18'. For example, and referring to FIG. 2, the end portion 23a of the pusher 23 could extend into the channel 22 in line with the lower pair of sprockets 7 so that it is in the path of the lower row of perforations 10b (this lower row of perforations is not shown in FIG. 2).

During automatic threading, the leading end 10a travels along the platform 2a and bypasses the pusher 23 but will eventually meet the inclined surface 11a of the guide member 11 to be deflected back into the film channel 22 and into the chamber 6 in a manner as described in connection with FIGS. 1 and 2. However, once the leading end 10a has moved past the pusher 23, the latter's end portion 23a is engaged by the film 10 (i.e., by that portion of the film 10 which is of full width) whereby the film bears against the end portion 23a and depresses the pusher 23 against the bias of the rather weak spring 18'. This causes the control lever 17 to rock in a clockwise direction and the lever 13 to rock in a counterclockwise direction so that the guide member 11 enters the adjoining portion of the window 2 and is coplanar with the platform 2a. The spring 18' is just strong enough to return the guide member 11 and the pusher 23 to the positions shown in FIG. 4 as soon as the end portion 23a of the pusher 23 is disengaged from the film 10. In this way, the spring 18' cannot adversely affect the position of that film frame which is adjacent to the platform 2a. It will be noted that the face of the end portion 23a is inclined in the same way as the surface 11a of the guide member 11. This reduces the likelihood of the full width of the film 10 being caught at the time it engages the pusher 23.

The improved camera is susceptible of many additional modifications without departing from the spirit of our invention. Thus, and contrary to the showing of FIG. 2, the guide member 11 need not be as wide as the window 2. It suffices if the guide member 11 extends the full width of the leading end 10a or even if the width of the guide member 11 is reduced below the width of the leading end 10a, as long as the latter is properly returned into the film channel 22 when it strikes the guide surface 11a of the guide member. Also, the surface 11a need not be flat but may assume a concave, convex or sinusoidal shape, particularly the shape of the letter S. FIG. 5 shows a guide member 111 having a concave guide surface 111a, and FIG. 6 shows a guide member 211 having a sinusoidal guide surface 211a. Furthermore, and as mentioned hereinbefore, the guide member 11 may be used in combination with other types of auto-threaders, not only the one shown in FIG. 1 or the one disclosed in the aforesaid copending application of Winkler and Ernst.

Without further analysis, the foregoing will so fully reveal the gist of the present invention that others can, by applying current knowledge, readily adapt it for various applications without omitting features which fairly constitute essential characteristics of the generic and specific aspects of our contribution to the art.

What is claimed as new and desired to be protected by Letters Patent is:

1. In a camera particularly for use with photographic roll film of the type whose leading end has a width less than the width of the remaining major part of the film, a housing having a first and a second chamber respectively arranged to accommodate a supply of roll film and a take-up spool, a film channel extending between said chambers and defining a path along which the leading end of the film can be advanced from said first toward said second chamber, and a window located in front of and communicating with said film channel so that a leading end which has a tendency to curl can enter said window on its way toward said second chamber; a mechanism for transporting the film between said chambers; and guide means positioned in said housing and having a guide surface inclined with reference to said path, at least while the leading end is transported past said window, and arranged to deflect the leading end which enters said window back into said film channel, said guide surface extending across at least a portion of that part of said channel which is adjacent to said window.

2. A structure as set forth in claim 1, further comprising automatic threading means including a rotary take-up spool provided in said second chamber for clamping the leading end and for thereupon convoluting the film around said spool in response to operation of said mechanism in a direction to transport the film into said second chamber.

3. A structure as set forth in claim 2, wherein said guide means comprises a substantially plate-like guide member.

4. A structure as set forth in claim 1, wherein said guide means comprises a movable guide member and wherein said guide surface is provided on said guide member, said guide member assuming an operative position when the film is not coupled to said take-up spool to thereby maintain said guide surface in inclined position with reference to said path so that said guide surface returns the leading end into said channel when the film transporting mechanism is operated to transport the leading end through said channel and into said second chamber.

5. A structure as set forth in claim 4, wherein said guide surface is flat.

6. A structure as set forth in claim 4, wherein said guide surface is concave.

7. A structure as set forth in claim 4, wherein said guide surface is of sinusoidal shape.

8. A structure as set forth in claim 4, wherein said guide means further comprises a carrier rockable about a fixed axis and supporting said guide member, and biasing means for urging said carrier to a position in which said guide surface assumes said operative position, at least when said film channel is empty.

9. A structure as set forth in claim 4, wherein said guide member is movable into said window.

10. A structure as set forth in claim 9, wherein said housing comprises a partition between said second chamber and said window and said guide member is adjacent to said partition opposite said second chamber.

11. In a camera, a housing having a first and a second chamber respectively arranged to accommodate a supply of roll film of the type whose leading end has a width less than the width of the remaining major part of the film and a take-up spool, a film channel extending between said chambers and defining a path along which the leading end of the film can be advanced from said first toward said second chamber, and a window located in front of and communicating with said film channel so that a leading end which has a tendency to curl can enter said window on its way toward said second chamber; a mechanism for transporting the film between said chambers; automatic threading means including a rotary take-up spool provided in said second chamber for clamping the leading end and for thereupon convoluting the film around said spool in response to operation of said mechanism in a direction to transport the film into said second chamber; and guide means positioned in said housing to deflect the leading end which enters said window back into said film channel, said guide means comprising a movable guide member having a guide surface which, at least when the film is not coupled to said take-up spool, assumes an operative position in which it is inclined in a direction to return the leading end into said film channel when said mechanism is operated to transport the landing end through said channel and into said second chamber, a carrier rockable about a fixed axis and supporting said guide member, biasing means for urging said carrier to a position in which said guide surface assumes said operative position, at least when said film channel is empty, and a control member articulately coupled to said carrier and rockably supported by said housing, said biasing means comprising resilient means for urging said control member to a position corresponding to operative position of said guide surface.

12. A structure as set forth in claim 11, wherein the coupling between said carrier and said control member comprises a pin and slot connection.

13. A structure as set forth in claim 11, further comprising frame counter means including a rotary member resettable to zero position, a cam carried by said rotary member, and a follower provided on said control member for tracking said cam.

14. A structure as set forth in claim 13, wherein said cam has a cam face tracked by said follower and configurated to effect movement of said guide surface into substantial parallelism with said film channel in response to movement of said rotary member from zero position.

15. A structure as set forth in claim 11, further comprising a pusher normally extending into said film channel and arranged to be dislodged by the film from said film channel to thereby rock said control member to a position in which said guide surface is substantially parallel with said film channel.

16. A structure as set forth in claim 15, wherein said pusher extends into a portion of said film channel which is bypassed by the leading end of the film.

17. A structure as set forth in claim 16, wherein said biasing means is weak enough to yield to the pressure of film against said pusher when the leading end of the film is coupled to said take-up spool.

18. A structure as set forth in claim 15, wherein said pusher has an end portion which normally extends into said film channel and comprises a face whose inclination is similar to that of said guide surface in the operative position thereof.

19. In a camera, a housing having a first and a second chamber respectively arranged to accommodate a supply of roll film of the type whose leading end has a width less than the width of the remaining major part of the film and take-up spool, a film channel extending between said chambers and defining a path along which the leading end of the film can be advanced from said first toward said second chamber, and a window located in front of and communicating with said film channel so that a leading end which has a tendency to curl can enter said window on its way toward said second chamber; a mechanism for transporting the film between said chambers; automatic threading means including a rotary take-up spool provided in said second chamber for clamping the leading end and for thereupon convoluting the film around said spool in response to operation of said mechanism in a direction to transport the film into said second chamber; and guide means positioned in said housing to deflect the leading end which enters said window back into said film channel, said guide means comprising a movable guide member having a guide surface which, at least when the film is not coupled to said take-up spool, assumes an operative position in which it is inclined in a direction to return the leading end into said film channel when said mechanism is operated to transport the leading end through said channel and into said second chamber, a carrier rockable about a fixed axis and supporting said guide member, and biasing means for urging said carrier to a position in which said guide surface assumes said operative position, at least when said film channel is empty, said biasing means being weak enough to allow for movement of said carrier to a second position in which said guide surface is substantially parallel with said film channel when said guide member is rocked by a portion of the film other than said leading end.

20. In a camera, a housing having a first and a second chamber respectively arranged to accommodate a supply of roll film of the type whose leading end has a width less than the width of the remaining major part of the film and a take-up spool, a film channel extending between said chambers and defining a path along which the leading end of the film can be advanced from said first toward said second chamber, and a window located in front of and communicating with said film channel so that a leading end which has a tendency to curl can enter said window on its way toward said second chamber; a mechanism for transporting the film between said chambers; automatic threading means including a rotary take-up spool provided in said second chamber for clamping the leading end and for thereupon convoluting the film around said spool in response to operation of said mechanism in a direction to transport the film into said second chamber; and guide means positioned in said housing to deflect the leading end which enters said window back into said film channel, said guide means comprising a guide member movable into said window and having a guide surface which, at least when the film is not coupled to said take-up spool, assumes an operative position in which it is inclined in a direction to return the leading end into said film channel when said mechanism is operated to transport the leading end through said channel and into said second chamber, said housing comprising a partition between said second chamber and said window and said guide member being adjacent to said partition opposite said second chamber, and a film platform adjacent to said channel and surrounding said window, said guide member being located within the confines of said platform.

References Cited

UNITED STATES PATENTS

| | | | |
|---|---|---|---|
| 1,864,100 | 5/1932 | Steiner | 95—34 |
| 2,092,177 | 9/1937 | McClay | 352—224 |
| 2,266,426 | 12/1941 | Koszalka et al. | 95—31 |
| 2,336,279 | 12/1943 | Mihalyi | 95—31 |
| 2,506,441 | 5/1950 | Charlin | 352—228 |
| 2,935,271 | 5/1960 | Vivie | 352—224 |
| 3,033,074 | 5/1962 | Schaefer | 352—224 |
| 3,136,209 | 6/1964 | Briskin et al. | 352—224 |
| 3,322,366 | 5/1967 | Hayden | 242—71.1 |

NORTON ANSHER, Primary Examiner

JOSEPH F. PETERS, Jr., Assistant Examiner

U.S. Cl. X.R.

352—224